(12) United States Patent
Kilgore et al.

(10) Patent No.: US 6,269,828 B1
(45) Date of Patent: *Aug. 7, 2001

(54) PRESSURE REGULATOR VALVE SEAT WITH MUTUALLY ORTHOGONAL FLOW CHANNELS

(75) Inventors: Jason T. Kilgore, Newport News; Barry S. Robinson, Williamsburg, both of VA (US)

(73) Assignee: Siemens Automotive Corporation, Alburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/455,311

(22) Filed: Dec. 6, 1999

(51) Int. Cl.[7] .................................................. G05D 16/02
(52) U.S. Cl. ............................ 137/14; 137/508; 123/459
(58) Field of Search ....................... 137/508, 14; 123/459

(56) References Cited

U.S. PATENT DOCUMENTS

| | | | |
|---|---|---|---|
| 2,839,078 | * 6/1958 | Lornitzo | 137/508 |
| 2,906,289 | * 9/1959 | Fox | 137/508 |
| 3,917,222 | 11/1975 | Kay et al. | 251/127 |
| 4,180,240 | 12/1979 | Sheldon et al. | 251/127 |
| 4,205,637 | 6/1980 | Ito et al. | 123/457 |
| 5,082,239 | 1/1992 | Feild | 251/120 |
| 5,113,831 | 5/1992 | Grant | 123/457 |
| 5,180,139 | 1/1993 | Gethmann et al. | 251/127 |
| 5,421,306 | 6/1995 | Talaski | 123/510 |
| 5,435,344 | 7/1995 | Robinson et al. | 137/508 |
| 5,435,345 | 7/1995 | Robinson et al. | 137/508 |
| 5,509,444 | 4/1996 | Robinson et al. | 137/508 |
| 5,577,478 | 11/1996 | Tuckey | 123/456 |
| 5,778,926 | 7/1998 | Tanaka et al. | 123/514 |

* cited by examiner

Primary Examiner—Stephen M. Hepperle

(57) ABSTRACT

A flow-through pressure regulator includes a housing having an inlet and an outlet offset along a longitudinal axis. The housing is separated by a divider into a first chamber and a second chamber. The divider has a passage that communicates the first chamber with the second chamber. The passage includes a first section extending along the longitudinal axis and a second section extending transverse to the longitudinal axis. A closure member permits or inhibits flow through the passage.

20 Claims, 6 Drawing Sheets

PRESSURE REGULATOR VALVE SEAT WITH MUTUALLY ORTHOGONAL FLOW CHANNELS

FIELD OF THE INVENTION

This invention relates to a valve seat for a pressure regulator for automotive fuel systems, and more particularly to a valve seat having a geometry which reduces the noise and fuel pressure associated with high fuel flow rates through the valve seat.

BACKGROUND OF THE INVENTION

Most modern automotive fuel systems utilize fuel injectors to deliver fuel to the engine cylinders for combustion. The fuel injectors are mounted on a fuel rail to which fuel is supplied by a pump. The pressure at which the fuel is supplied to the fuel rail must be metered to ensure the proper operation of the fuel injectors. Metering is carried out using pressure regulators which control the pressure of the fuel in the system at all engine r.p.m. levels.

Known pressure regulators, as shown in FIG. 7, employ a spring biased valve seat with a longitudinal flow passage. A detailed view of a known valve seat is shown in FIG. 8. The valve seat is biased to a closed position to prevent the flow of fuel through the pressure regulator at low fuel pressures. As fuel pressure builds in the system, the pressure against the valve seat overcomes the biasing force of the spring, allowing fuel to flow through the valve seat, thereby controlling the fuel pressure in the system.

Fuel flow rate, measured in liters per hour, through known pressure regulators tends to be low at high engine speed, measured in revolutions per minute, as large quantities of fuel are consumed in the combustion process. At low engine speeds, less fuel is consumed in combustion and flow rates through the pressure regulators are high. These high fuel flow rates through known pressure regulator valve seats produce unacceptably high noise and pressure levels. A valve seat is needed that maintains flow-related noise and pressure within acceptable levels, even at high fuel flow rates.

SUMMARY OF THE INVENTION

The present invention provides a flow-through pressure regulator which maintains a substantially constant noise output from low fuel flow rates to high fuel flow rates. Further, the pressure of fuel at the maximum fuel flow rate is substantially equal to or less than the fuel pressure at the minimum fuel flow rate in the regulator. The flow-through pressure regulator includes a housing having an inlet and an outlet offset along a longitudinal axis. The housing is separated by a divider into a first chamber and a second chamber. The divider has a passage that communicates the first chamber with the second chamber. The passage includes a first section extending along the longitudinal axis and a second section extending transverse to the longitudinal axis. The first section provides a first communication path between the first chamber and the second chamber. The second section provides a second communication path between the first section and the second chamber. A closure member permits or inhibits flow through the passage.

The divider can include a valve seat that is suspended by the divider in the housing and provides the passage. The valve seat has a first seat portion and a second seat portion disposed along the longitudinal axis on opposite sides of the divider such that the first seat portion is disposed the first chamber and the second seat portion is disposed in the second chamber. The first section of the passage extends along the longitudinal axis through the first portion and into the second portion of the seat. The second section of the passage extends transverse to the longitudinal axis in the second portion of the seat.

The valve seat can comprise a first surface disposed in the first chamber, a second surface disposed in the second chamber, and a side surface disposed between the first surface and the second surface. The first section of the passage communicates with the first surface and the second surface. The second section communicates with the first section and the side surface. The first section has a first wall extending from the first surface to the second surface. The second section has a second wall and a third wall, each communicating with the first section and the side surface. Each of the first wall, second wall, and third wall can comprise a cylindrical configuration. The first wall can have a first diameter, second diameter, and third diameter, where the first diameter comprises a selected value. The second diameter is proximate the second wall and the third wall. The diameter of the second wall and the third wall comprise a value approximately equal to the square root of the selected value. In the preferred embodiment, each of the second wall and the third wall extends through the first wall to diametrically opposed locations on the side surface. The first wall, the second wall, and the third wall comprise, respectively, a first central axis, a second central axis and a third central axis that intersect at a common point located within the second portion of the seat.

In a preferred embodiment, the divider is a diaphragm, and a first biasing element is located in the second chamber. The closure member includes a ball disposed in a retainer. The housing includes a first cup-shaped member and a second cup-shaped member. In a preferred embodiment, the flow-through pressure regulator of the present invention has a sound rating in Sones that remains substantially constant from a low fuel flow rate to a high fuel flow rate. The pressure of fuel in the regulator of the present invention remains substantially constant or decreases slightly as the fuel flow rate through the regulator increases from a minimum fuel flow rate to a maximum fuel flow rate.

The present invention also provides a low noise valve seat for a flow-through regulator. The valve seat has an exit geometry which reduces output noise and pressure levels at high fuel flow rates. The valve seat includes a first seat portion having a first surface disposed about a central axis, a second seat portion having a second surface offset from the first surface along the central axis, a side surface disposed between the first surface and the second surface and a passage extending from the first chamber through the first portion and the second portion to the second chamber. The passage has a first section and a second section. The first section of the passage extends along the central axis in both the first portion and the second portion of the valve seat. The second section of the passage extends transverse to the longitudinal axis in the second portion of the valve seat. The first section communicates with the first surface and the second surface, and the second section communicates with the first section and the side surface.

The present invention also provides a method of inversely correlating maximum pressure and flow values of a flow-through regulator while stabilizing noise generation of the flow-through regulator. The flow-through regulator includes a housing with an inlet and an outlet offset along a longitudinal axis, a divider separating the housing into a first chamber and a second chamber, a passage through the divider that provides communication between the first chamber and the second chamber, and a closure member that permits or inhibits flow through the passage. The method is achieved by establishing a first communication path between the first chamber and the second chamber with a first section of the passage extending along the longitudinal axis, and establishing a second communication path between the first section and the second chamber with a second section of the passage extending transverse to the longitudinal axis.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
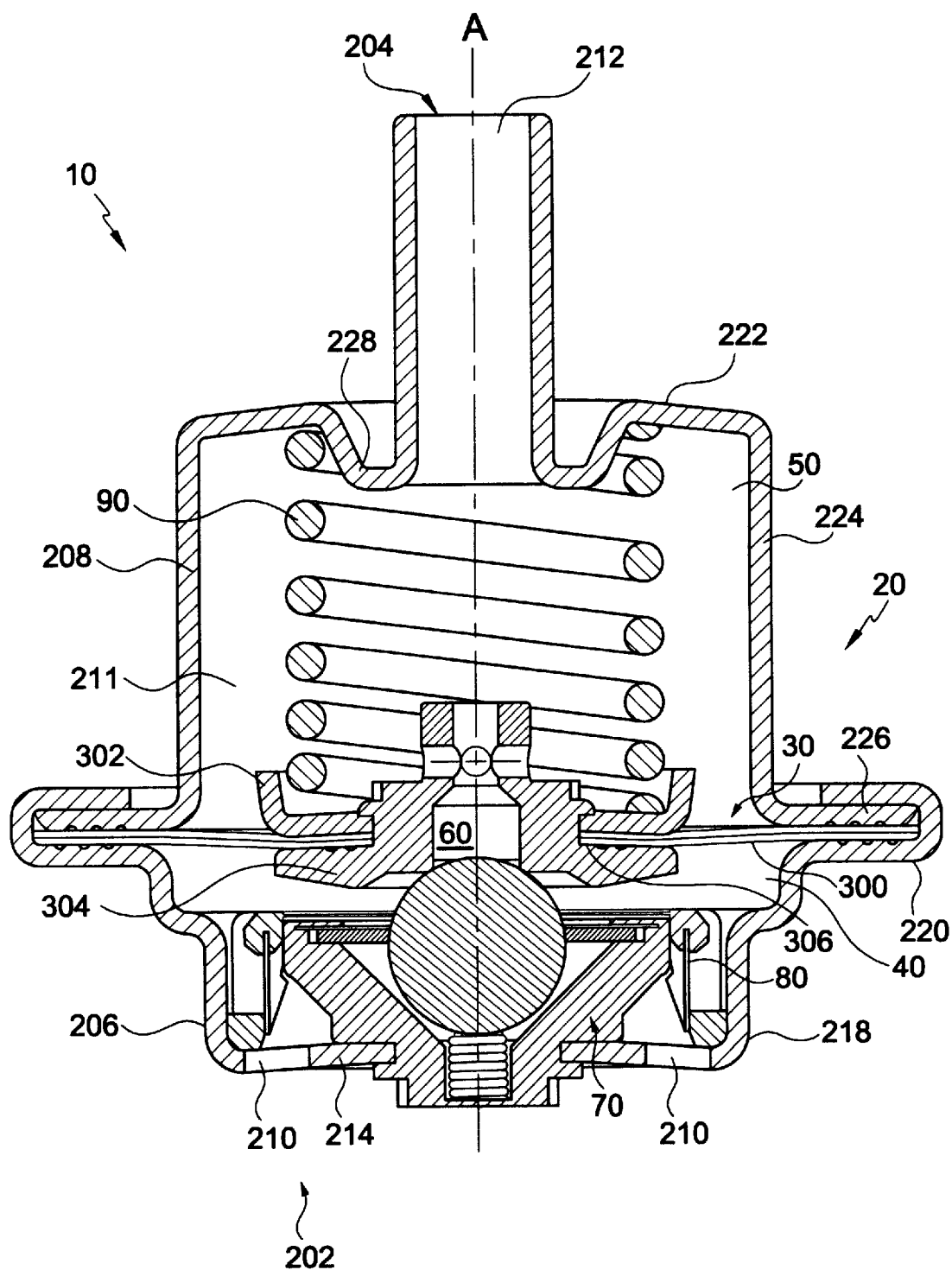
FIG. 1 illustrates a flow-through regulator of the present invention.

FIG. 1 illustrates a flow-through pressure regulator 10 according to the present invention. The flow-through pressure regulator 10 includes a housing 20. The housing 20 is separated by a divider 30 into a first chamber 40 and a second chamber 50. The divider 30 has a passage 60 that communicates the first chamber 40 with the second chamber 50. A closure member 70 permits or inhibits flow through the passage 60. A filter 80 is disposed in the flow path of the housing 20. The housing 20, has an inlet 202 and an outlet 204 offset along a longitudinal axis A. The housing 20 can include a first cup-shaped member 206 and a second cup-shaped member 208 that are crimped together to form a unitary housing 20 with a hollow interior 211. Although the unitary housing is formed by two joined members, it is to be understood that the unitary housing could be formed with multiple members integrated together or, alternatively, a monolithic member. The inlet 202 of the housing 20 is located in the first cup-shaped member 206, and the outlet 204 of the housing 20 is located in the second cup-shaped member 208. The inlet 202 can be a plurality of apertures 210 located in the first cup-shaped member 206. The outlet 204 can be a port 212 disposed in the second cup-shaped member 208.

The first cup-shaped member 206 can include a first base 214, a first lateral wall 218 extending in a first direction along the longitudinal axis A from the first base 214, and a first flange 220 extending from the first lateral wall 218 in a direction substantially transverse to the longitudinal axis A. The second cup-shaped member 208 can include a second base 222, a second lateral wall 224 extending in a second direction along the longitudinal axis A from the second base 222, and a second flange 226 extending from the second lateral wall 224 in a direction substantially transverse to the longitudinal axis A. A divider 30, which can be a diaphragm 300, is secured between the first flange 220 and the second flange 226 to separate the first chamber 40 and the second chamber 50. The first flange 220 can be rolled over the circumferential edge of the second flange 226 and can be crimped to the second flange 226 to form the unitary housing 20.

A first biasing element 90 which is preferably a spring, is located in the second chamber 50. The first biasing element 90 engages a locator 228 on the base 222 of the second cup-shaped member 208 and biases the diaphragm 300 toward the base 214 of the first-cup shaped member 206. The first biasing element 90 biases the diaphragm 300 of the regulator 10 at a predetermined force, which relates to the pressure desired for the regulator 10. The base 222 of the second cup-shaped member 208 has a dimpled center portion that provides the outlet port 212 in addition to the locator 228. The first end of the spring 90 is secured on the locator 228, while a second end of the spring 90 can be supported by a retainer 302, which is secured to a valve seat 304 mounted in a central aperture 306 in the diaphragm 300.

Figure 2:
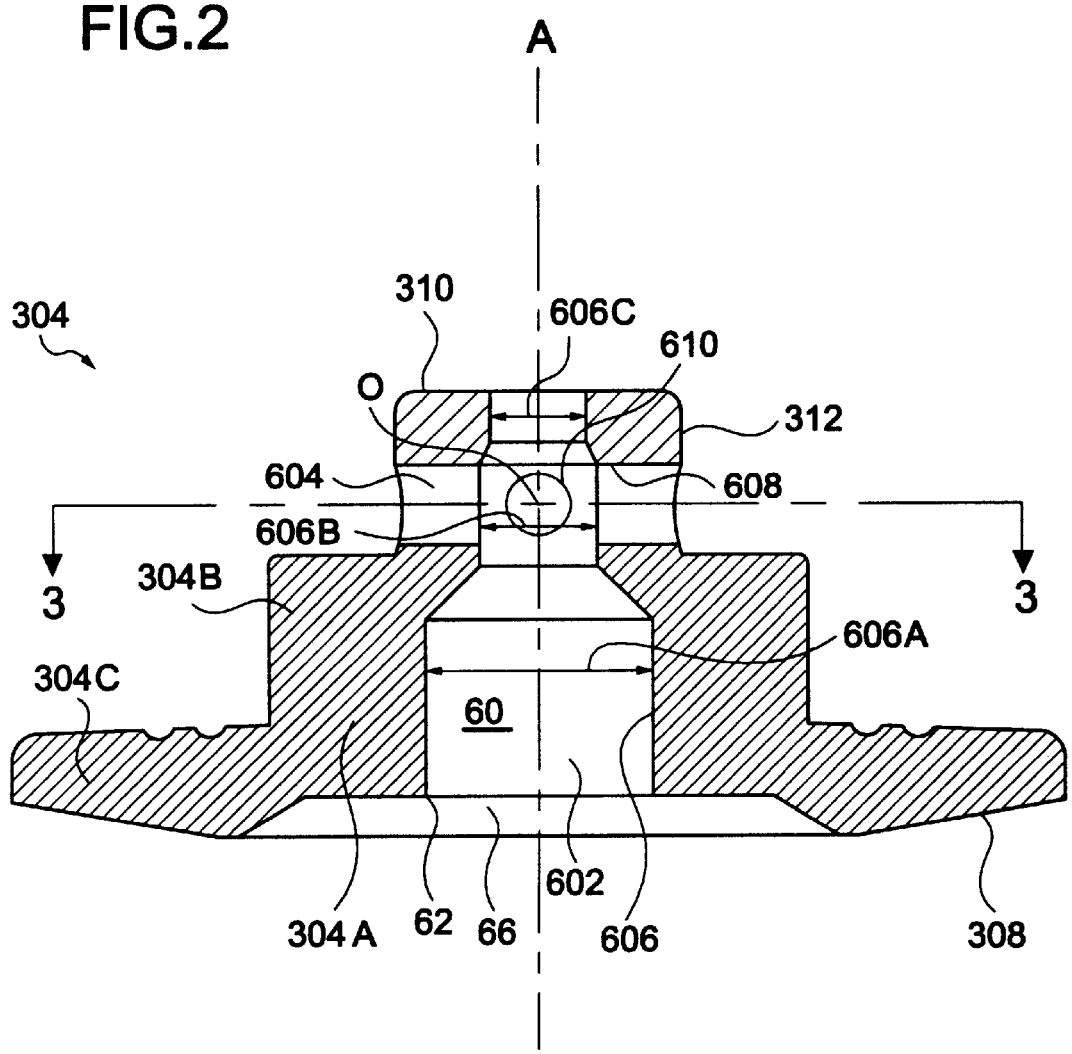
FIG. 2 illustrates the valve seat of the flow-through regulator shown in FIG. 1.

FIG. 2 shows a preferred embodiment of the valve seat 304. The valve seat 304 is suspended by the divider 30 in the housing 20 (FIG. 1) to provide the passage 60, having a first section 602 and a second section 604. The valve seat 304 has a first seat portion 304A and a second seat portion 304B disposed along the longitudinal axis A. The first seat portion 304A is disposed in the first chamber 40 and the second seat portion 304B is disposed in the second chamber 50 (FIG. 1). The first section 602 of the passage 60 extends along the longitudinal axis A in both the first portion 304A and the second portion 304B of the valve seat 304. The second section 604 of the passage 60 extends transverse to the longitudinal axis A in the second portion 304B of the valve seat 304.

Figure 3:
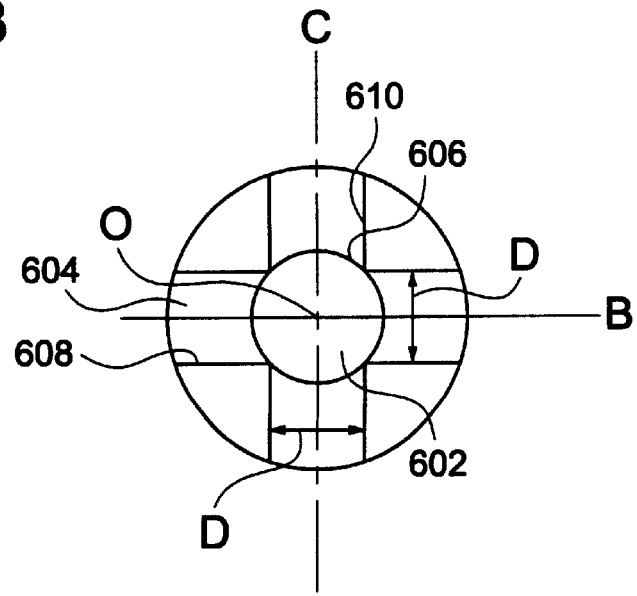
FIG. 3 illustrates a sectional view of the valve seat taken along line 3—3 of FIG. 2.

The valve seat 304 preferably has a first surface 308 disposed in the first chamber 40 (FIG. 1), a second surface 310 disposed in the second chamber 50 (FIG. 1), and a side surface 312 extending between the first surface 308 and the second surface 310. The first section 602 of the passage 60 communicates with the first surface 308 and the second surface 310. The second section 604 of the passage 60 communicates with the first section 602 and the side surface 312. The first section 602 has a first wall 606 extending from the first surface 308 to the second surface 310. The second section has a second wall 608 and a third wall 610 extending from the first wall 606 to the side surface 312. Each of the first wall 606, second wall 608, and third wall 610 can comprise a cylindrical configuration. The first wall 606 has a first diameter 606A, a second diameter 606B, and a third diameter 606C, as shown in FIG. 2. The first diameter 606A of the first wall 606 comprises a selected value. The second diameter 606B is proximate the second wall 608 and the third wall 610. The diameter D of the second wall 608 and third wall 610, shown in FIG. 3, has a value approximately equal to the square root of the selected value. Each of the second wall 608 and the third wall 610 can extend through the first wall 606 to diametrically opposed locations on the side surface 312. The first wall 606, the second wall 608, and the third wall 610 define, respectively, a first central axis A, a second central axis B, and a third central axis C which intersect at a common point O within the second portion 304B of the seat 304. The central axes A–C and point O are shown in FIGS. 2 and 3.

It should be noted that the valve seat 304 of the present invention can be manufactured as a monolithic valve seat or, alternatively, as separate components that can be assembled. The valve seat 304 can be used to retrofit existing valve seats having only a longitudinal flow path. For example, the separate components can comprise a cap providing a second section 604 of the passage 60, having second wall 608 and third wall 610.

Figure 4:
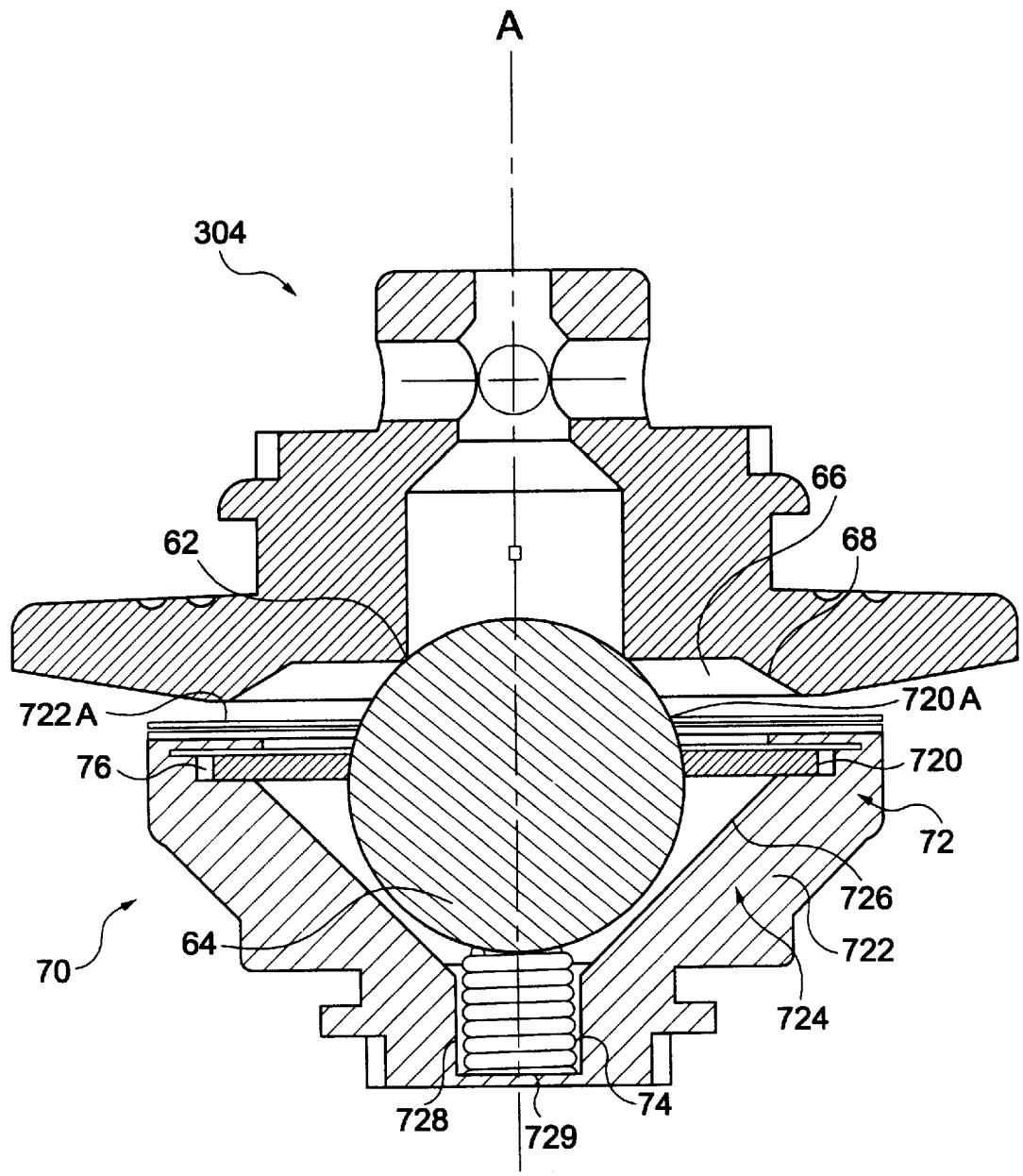
FIG. 4 illustrates a detailed view of the valve seat of the present invention and a closure member.

At an end of the passage 60 opposite the second seat surface 310 is a seating surface 62 on which the closure member 70, which can be a valve actuator ball 64, seats. FIG. 4 shows the ball 64 seated on the valve surface 62. This surface 62 begins at an inner edge of a pocket 66 which has its side walls 68 converging toward the axis A of the valve seat 304. This end of the valve seat 304 opens into the first chamber 40 (FIG. 1). In the manufacturing of the valve seat 304, the seating surface 62 is finished to assure a smooth sealing surface for the ball 64.

FIG. 4 shows that the closure member 70 can include a ball 64 disposed in a retainer 72. The retainer 72 is located in the first chamber 40 (FIG. 1), and has a flat annulus 720 secured to a valve actuator housing 722. The housing 722 can have an internal funnel 724 that includes a conical portion 726 confronting the flat annulus 720 and a cylindrical portion 728 occluded by an end wall 729. The conical portion 726 of the funnel 724 can support the ball 64. The cylindrical portion 728 of the funnel 724 supports a spring 74 that biases the ball 64 toward the divider 30 (FIG. 1). The conical portion 726 is sized so as to not interfere with the movement of the ball 64. The ball 64 is retained by the flat annulus 720 on a ball surface opposite the spring 74. The annulus 720 has a central aperture 720A that is somewhat smaller than the diameter of the ball 64. The aperture 720A is finished to prevent a rough surface from contacting the ball 64. At the wide end of the funnel 724 there is formed a pocket 76. The annulus 720, which is located above the major diameter of the ball or its horizontal axis, is located in the pocket 76 against the inside of the upper edge of the valve actuator housing 722. The annulus 720 has an outside diameter which is smaller than the diameter of the pocket 76 of the housing 722 and can be retained against separation from the housing 722 by crimping of the upper edge 722A of the valve actuator housing 722 over the annulus 720. The annulus 720 is not held tightly in the pocket 76 at the end of the funnel 724, but is free to move both axially and radially in the pocket 76.

One method of assembling the fuel regulator 10 is by first securing the valve actuator housing 722 to the first cup-shaped member 206. The small bias spring 74 is placed in the bore 728. The ball 64 is then located in the conical portion 726 of the funnel 724 formed in the valve actuator housing 722. Next, the annulus 720 is placed in the pocket 76 on the upper edge of the housing 722 and the edges 722A of the housing 722 are crimped over to retain the annulus 720 in the pocket 76. The valve seat 304 is located and secured in the central aperture 306 of the diaphragm 300 between a flange 304C of the valve seat member 304 and the spring retainer 302. This completed diaphragm is located on the upper flange surface 220 of the first cup-shaped member 206. The bias spring 90 is positioned in the spring retainer 302 and the second cup-shaped member 208 is then placed over the spring 90 and located on the diaphragm 300. The flange 220 of the first cup-shaped member 206 is crimped down to secure the second cup-shaped member 208. The first and second cup-shaped members 206, 208 and the diaphragm 300 form a unitary member. The pressure at which the fuel is maintained is determined by the spring force of the bias spring 90.

The operation of the flow-through pressure regulator will now be described. The bias spring 90 acts through the retainer 302 to bias the divider 30 toward the base 214 of the first cup-shaped member 206. The spring 74 functions to bias the ball 64 against the seating surface 62 in the valve seat member 304. When the ball 64 is seated against surface 62, the valve seat is in a closed position and no fuel can pass through the regulator.

Fuel enters the regulator 10 through apertures 210 and exerts pressure on the divider 30. When the pressure of the fuel is greater than the force exerted by the large bias spring 90, the diaphragm 300 moves in an axial direction and the ball 64 leaves the seating surface 62 of the valve seat member 304. Fuel can then flow through the regulator 10. The fuel enters the first section 602 of the passage 60, then passes into the second section 604. In the second section 604, the fuel flows through the flow passages in the second portion 304B of the seat 304. In the passages, the fuel is directed parallel to and transverse to the longitudinal axis A, and leaves the valve seat 304 through the second surface 310 and the side surface 312. Experimentation has shown that this exit geometry on the valve seat provides a substantially constant noise output level from a low fuel flow rate to a high fuel flow rate. Further, the pressure of fuel in the regulator 10 has been found to remain substantially constant or decrease slightly as the fuel flow rate increases from a low fuel flow rate to a high fuel flow rate.

As the incoming fuel pressure is reduced, the force of the large bias spring 90 overcomes the fuel pressure and returns the valve seat member 304 to seated engagement with the ball 64, thus closing the passage 60 in the valve seat member 304.

Figure 5:
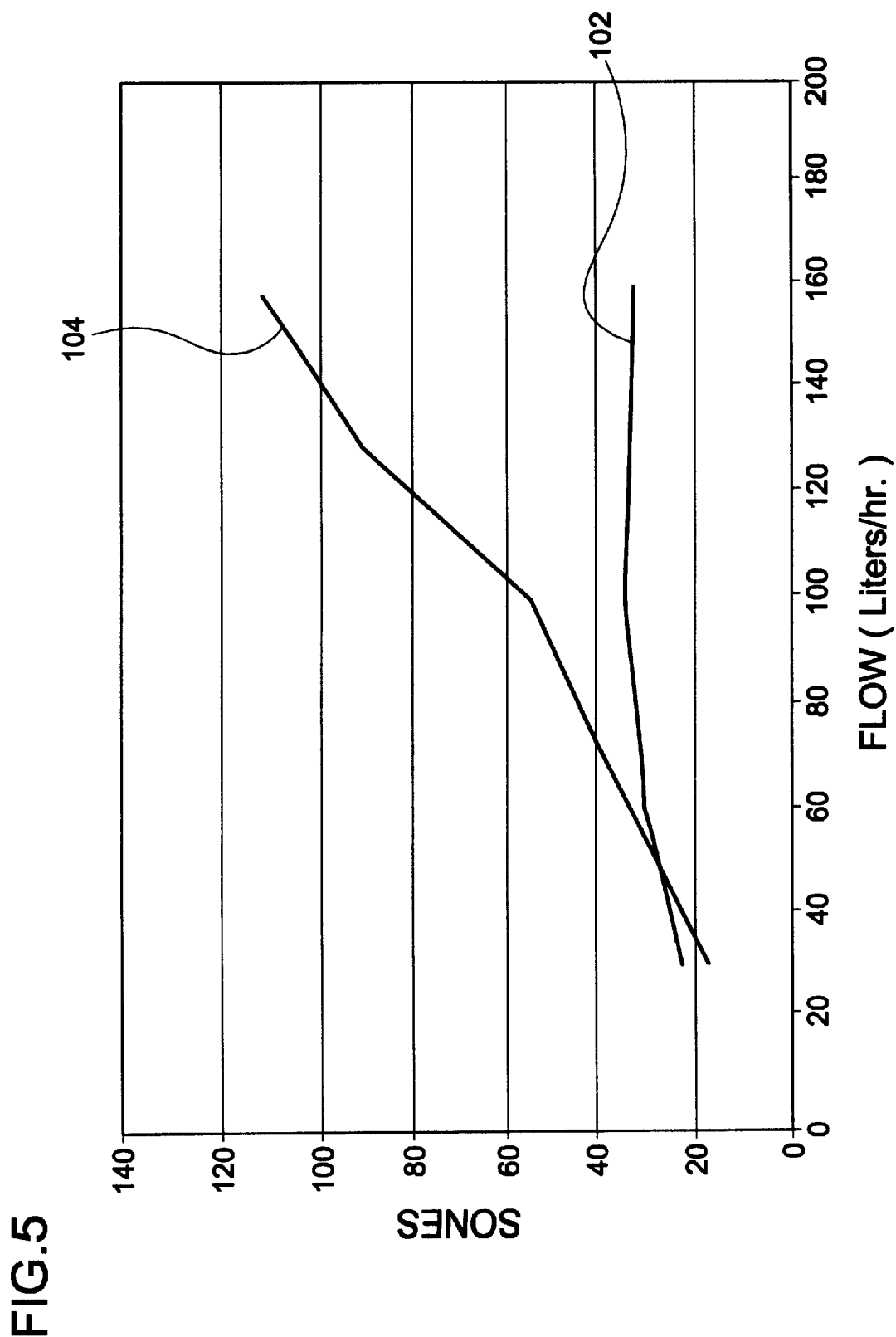
FIG. 5 is a graph illustrating the relationship between noise, measured in Sones, and flow rate.

As shown in FIG. 5, curve 102 shows that flow-related noise is kept generally consistent over a range of fuel flow rates using the regulator 10 of the present invention. In contrast, curve 104 shows that noise increases substantially as flow increases through conventional regulators.

Figure 6:
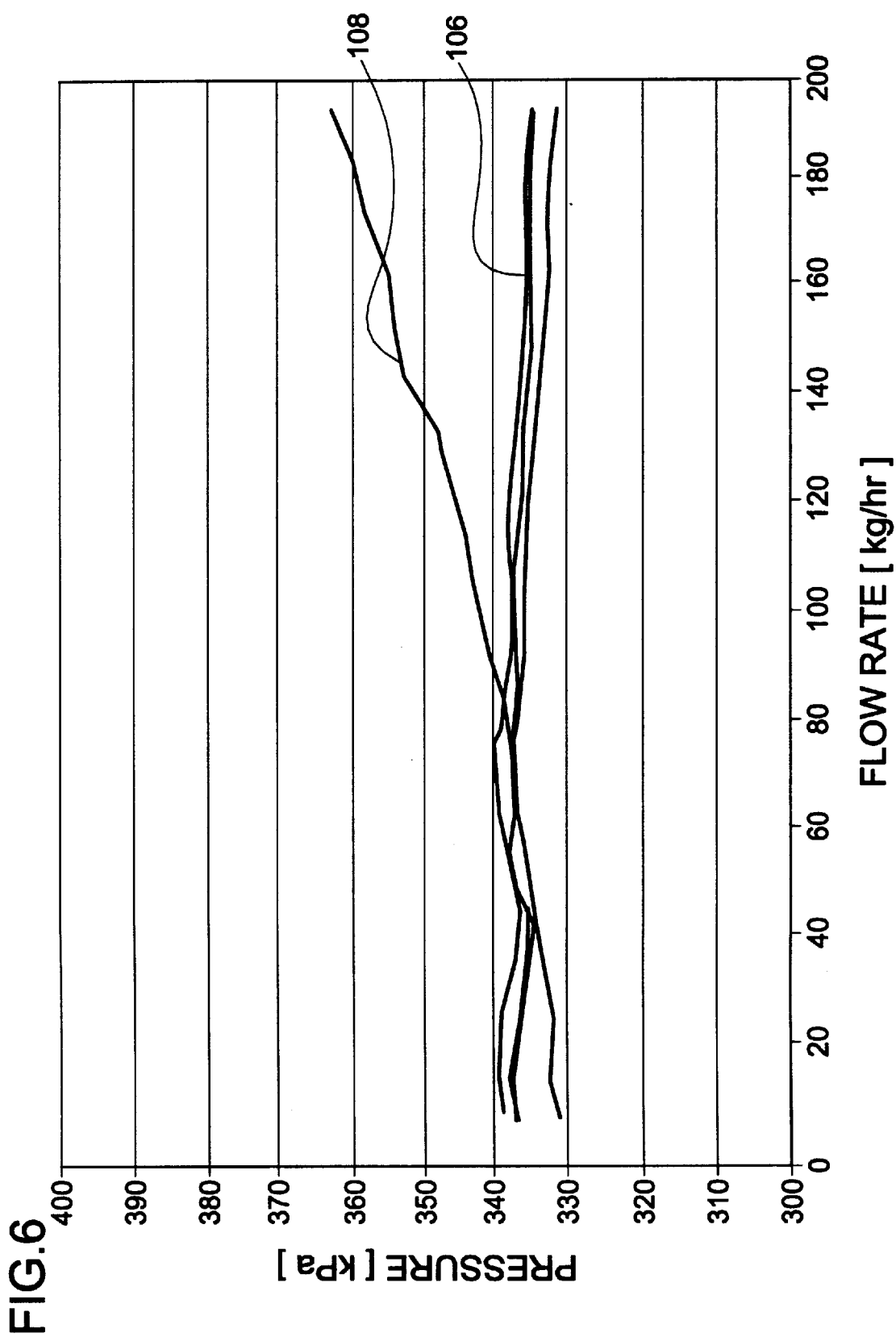
FIG. 6 is a graph illustrating the relationship between pressure and flow rate.
Figure 7:
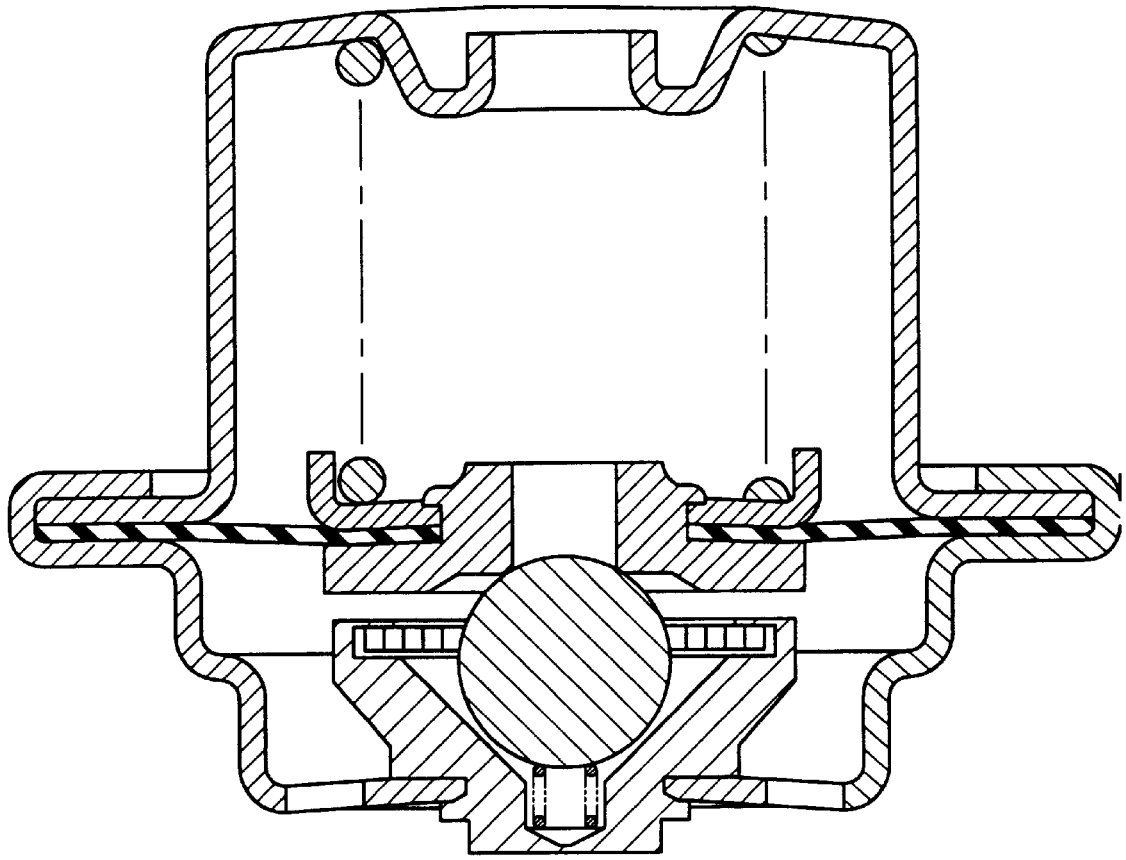
FIG. 7 illustrates a prior art pressure regulator.
Figure 8:
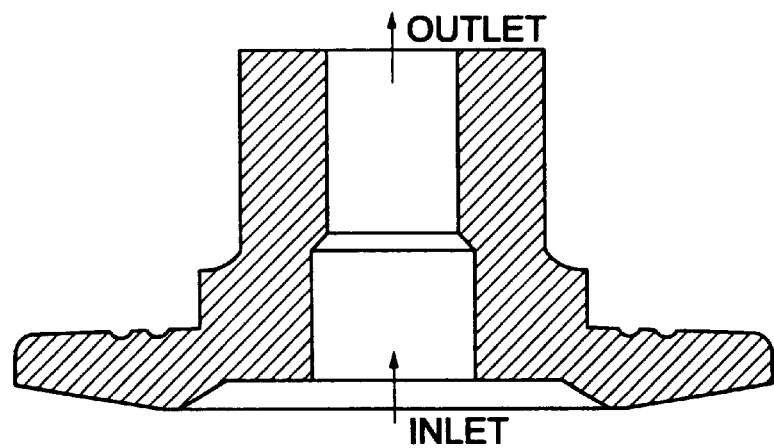
FIG. 8 illustrates a detailed view of a prior art valve seat.

As shown in FIG. 6, curve 106 shows that fuel pressure in the regulator 10 at the maximum fuel flow rate is substantially equal to or less than the fuel pressure at the minimum fuel flow rate. In contrast, curve 108 shows the increase in fuel pressure as the fuel flow rate increases through conventional regulators.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What we claim is:

1. A flow-through pressure regulator, comprising:
   a housing having an inlet and an outlet offset along a longitudinal axis;
   a divider separating the housing into a first chamber and a second chamber, the divider having a passage that communicates the first chamber with the second chamber, the passage including a first section along the longitudinal axis and a second section extending transverse to the longitudinal axis, the first section providing a first communication path between the first chamber and the second chamber, and the second section providing a second communication path between the first section and the second chamber;

a closure member that permits or inhibits flow through the passage.

2. The flow-through regulator of claim 1, wherein the divider comprises a seat, the seat being suspended by the divider in the housing to provide the passage, the seat having a first seat portion and a second seat portion disposed along the longitudinal axis, the first seat portion being disposed in the first chamber, the second seat portion being disposed in the second chamber, the first section of the passage extending along the longitudinal axis in both the first portion and the second portion of the seat, and the second section of the passage extending transverse to the longitudinal axis in the second portion of the seat.

3. The flow-through regulator of claim 2, wherein the seat comprises a first surface disposed in the first chamber, a second surface disposed in the second chamber, and a side surface disposed between the first surface and the second surface, the first section communicating with the first surface and the second surface, and the second section communicating with the first section and the side surface.

4. The flow-through regulator of claim 3, wherein the first section comprises a first wall extending from the first surface to the second surface, and wherein the second section comprises a second wall and a third wall.

5. The flow-through regulator of claim 4, wherein each of the first wall, second wall, and third wall comprises a cylindrical configuration, the first wall having a first diameter, second diameter, and third diameter.

6. The flow-through regulator of claim 5, wherein the first diameter of the first wall comprises a selected value, the second diameter being proximate the second wall and the third wall, and wherein the diameter of the second wall and the third wall comprises a value approximately equal to the square root of the selected value.

7. The flow-through regulator of claim 6, wherein each of the second wall and the third wall extends through the first wall to diametrically opposed locations on the side surface.

8. The flow-through regulator of claim 7, wherein the first wall, the second wall, and the third wall are mutually orthogonal.

9. The flow-through regulator of claim 8, wherein the first wall, the second wall, and the third wall comprise, respectively, a first central axis, a second central axis and a third central axis, and wherein the first central axis, the second central axis, and the third central axis intersect at a common point located within the second portion of the seat.

10. The flow-through fuel pressure regulator of claim 1, wherein the closure member comprises a ball disposed in a retainer, the retainer being located in the first chamber, and having a flat annulus secured to a housing, the housing having an internal funnel, the internal funnel including a conical portion confronting the flat annulus and a cylindrical portion with an end wall, the conical portion of the funnel supporting the ball, and the cylindrical portion of the funnel supporting a spring that biases the ball toward the divider.

11. The flow-through regulator of claim 1, wherein the housing comprises a first cup-shaped member and a second cup-shaped member, the first cup-shaped member having a first base, a first lateral wall extending in a first direction along the longitudinal axis from the first base, and a first flange extending from the first lateral wall in a direction substantially transverse to the longitudinal axis, the second cup-shaped member having a second base, a second lateral wall extending in a second direction along the longitudinal axis from the second base, and a second flange extending from the second lateral wall in a direction substantially transverse to the longitudinal axis, the first flange and the second flange being secured together to provide a unitary housing, and wherein the divider comprises a diaphragm secured between the first flange and the second flange to provide the first chamber and the second chamber.

12. The flow-through regulator according to claim 1, wherein the flow-through pressure regulator emits sound at a sound rating in Sones that remains substantially constant from a low fuel flow rate to high fuel flow rate.

13. The flow-through regulator according to claim 1, wherein the pressure of fuel at a maximum fuel flow rate is substantially equal to or less than the pressure of fuel at a minimum fuel flow rate.

14. A seat for a flow-through regulator, the seat comprising:

a first seat portion having a first surface disposed about a longitudinal axis;

a second seat portion having a second surface offset from the first surface along the longitudinal axis;

a side surface disposed between the first surface and the second surface; and a passage having a first section and a second section, the first section of the passage extending along the longitudinal axis in both the first portion and the second portion of the seat, the second section of the passage extending transverse to the longitudinal axis in the second portion of the seat, the first section including a first wall communicating with the first surface and the second surface, and the second section comprising a second wall and a third wall communicating with the first wall and the side surface.

15. The seat of claim 14, wherein each of the first wall, second wall, and third wall comprises a cylindrical configuration, the first wall having a first diameter, second diameter, and third diameter, and wherein the first diameter of the first wall comprises a selected value, the second diameter being proximate the second wall and the third wall, and wherein the diameter of the second wall and the third wall comprises a value approximately equal to the square root of the selected value.

16. The seat of claim 14, wherein each of the second wall and the third wall extends through the first wall to diametrically opposed locations on the side surface, wherein the first wall, the second wall, and the third wall comprise, respectively, a first central axis, a second central axis and a third central axis that intersect at a common point located within the second portion of the seat.

17. A method of inversely correlating maximum pressure and flow values of a flow-through regulator while stabilizing noise generation of the flow-through regulator, the flow-through regulator including a housing with an inlet and an outlet offset along a longitudinal axis, a divider separating the housing into a first chamber and a second chamber, the divider including a passage that provides communication between the first chamber and the second chamber, and a closure member that permits or inhibits flow through the passage, the method comprising:

establishing a first communication path between the first chamber and the second chamber with a first section of the passage extending along the longitudinal axis; and establishing a second communication path between the first section and the second chamber with a second section of the passage extending transverse to the longitudinal axis.

18. The method of claim 17, further comprising:

providing the first section with a first wall;

providing the second section with a second wall and a third wall;

providing each of the first wall, second wall, and third wall with a cylindrical configuration, the first wall having a first diameter, second diameter, and third diameter; and selecting the value of the diameter of the second and third walls to be approximately equal to the square root of the value of the first diameter of the first wall.

19. The method of claim 17, further comprising:

providing the first section with a first wall;

providing the second section with a second wall and a third wall;

extending each of the second wall and the third wall through the first wall to diametrically opposed locations on a side surface of the divider; and intersecting a first central axis of the first wall, a second central axis of the second wall, and a third central axis of the third wall at a common point.

20. The method of claim of 17, further comprising:

providing a seat in the divider, the seat having a first seat portion and a second seat portion, the first seat portion and the second seat portion being disposed along the longitudinal axis, the first seat portion being disposed in the first chamber and the second seat portion being disposed in the second chamber; and locating the passage between the first seat portion and the second seat portion to provide communication between the first chamber and the second chamber.

* * * * *